Jan. 18, 1955

E. B. GORTMAKER 2,699,634

HARROW HITCH

Filed March 11, 1950

INVENTOR.
Edward B. Gortmaker
BY
*Sam J. Slotky*
ATTORNEY

# United States Patent Office 2,699,634
Patented Jan. 18, 1955

2,699,634

HARROW HITCH

Edward B. Gortmaker, Monroe, S. Dak.

Application March 11, 1950, Serial No. 149,106

1 Claim. (Cl. 55—84)

My invention pertains to a harrow hitch.

An object of my invention is to provide a hitch for harrows or similar equipment wherein the hitch includes certain safety features such as preventing the harrow from being carried up over a tractor rear wheel and thereby injuring the operator.

A further object of my invention is to provide a very simple arrangement which can be manufactured at a reasonable cost.

A further object of my invention is to provide an arrangement wherein the hitch includes pivoted portions so that the hitch can be collapsed along a lateral plane.

With these and other objects in view, my invention consists in the construction, arrangement, and combination of the various parts of my device, whereby the objects contemplated are attained as hereinafter more fully set forth, pointed out in my claims, and illustrated in the accompanying drawings, in which:

Figure 1:
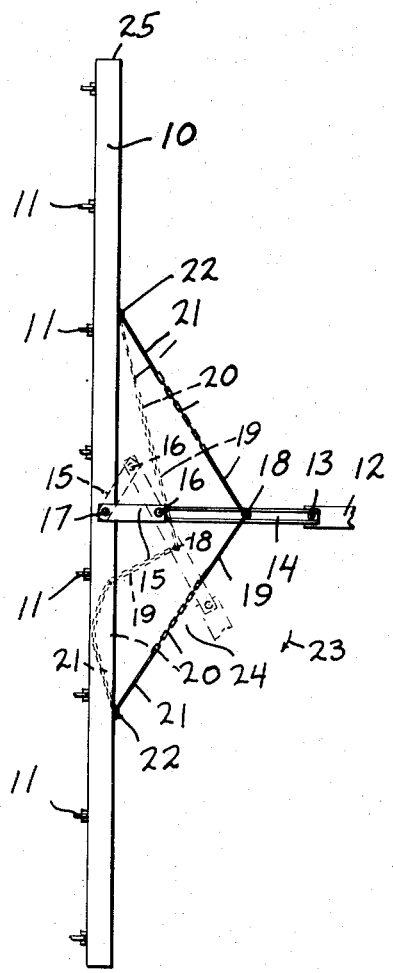
Figure 1 is a plan view of the hitch as attached to a harrow unit.
Figure 2:
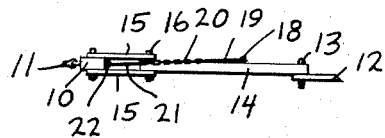
Figure 2 is a side elevation of Figure 1.

A principal objective of my invention is to provide a hitch which includes safety features to guard against the possibility of the harrow to which the hitch is attached being carried upwardly along the rear wheel of a tractor which is drawing the harrow when the tractor makes a rather sharp turn. Usually, heretofore, certain portions of the hitch framework will abut against the rear wheel when the tractor makes such turns, the entire harrow then being carried upwardly and injuring the operator.

I have used the character 10 to indicate the transverse bar of the harrow, the character 11 indicating portions of the further framework which can include the toothed type of harrow or other type, these portions not being shown since they are not important to the invention.

I have further used the character 12 to indicate the tractor draw-bar to which the harrow is to be attached, and I have used the character 13 to indicate a pin which is attached to the channel-shaped member 14. Straddling the inner end of the channel-shaped member 14 are a pair of straps 15 which are pivoted by means of a further suitable pin 16 to the member 14, the connection at this point being freely pivotal in a lateral direction. The member 16 can be shouldered whereby the straps 15 will pivot freely with respect to the member 14, or any other suitable construction can be used.

The straps 15 are pivotally secured at 17 to the transverse bar 10, and attached to the member 14 is a vertical stud 18 to which are attached the rods 19, the rods 19 being attached to the short chains 20, the chains 20 being attached to further rods 21, the rods 21 being pivotally secured at 22 to suitable U-bolts which in turn are attached to the member 10.

The device operates in the following manner. Assuming that the tractor which is drawing the arrangement turns in the direction of the arrow 23, ordinarily at such abrupt turns, any rigid framework which would be near the harrow would tend to be carried up over the wheel in the approximately position as indicated by the character 24. However, it will be noted that as the tractor turns, and due to the fact that the upper rod members 19, 21, and chain member 20 as viewed in Figure 1 will be under tension, the pivoting of the members 14 and 15 at 16 and 17 will collapse the members 14 and 15 towards each other as clearly shown by the dotted structure, at the same time allowing the lower rods 19, 21 and chain 20 to collapse to an approximate position as shown by the dotted lines in Figure 1, in this way practically completely eliminating any contacting structure which would otherwise contact the tractor wheel, thereby providing a safety arrangement whereby no projecting parts will be involved, thereby allowing the tractor to turn with safety in a very short turn, so that the arrangement can then be used conveniently in the field by driving directly up to a fence for instance, and turning rather sharply.

This articulated arrangement also allows the harrow teeth to move laterally when striking obstructions, and the hitch and harrow can also be conveniently drawn through a narrow gate by drawing the harrow from the end 25 and allowing the various members to collapse as shown.

It will be noted that the attachment of the rods 19 and 21 with the centrally positioned chains 20 provides a structure more satisfactory than a complete chain in order to prevent tangling, etc.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

In combination with a multiple harrow drag bar, a hitch therefore comprising a first tongue memer attached on a vertical pivot point at its forward end to a vehicle drawing said multiple harrow drag bar, a second tongue member having its forward end pivoted on a vertical pivot point to the rear end of said first tongue member and on a vertical pivot point to said multiple harrow drag bar at its rear end, both of said tongue members normally being positioned substantially at right angles to said multiple harrow drag bar and in alignment with each other, a pair of flexible members attached between said first tongue member and said multiple harrow drag bar whereby one of said flexible members will draw said multiple harrow drag bar around when said drawing vehicle is turned, and whereby the other of said flexible members will collapse, and also causing said tongue members to fold towards each other, the attachment of said flexible members to said first tongue member being intermediate the ends of said first tongue member and at a substantial distance from the pivotal attachment of said first tongue member and said vehicle.

References Cited in the file of this patent

UNITED STATES PATENTS

| Number | Name | Date |
| --- | --- | --- |
| 1,337,870 | Wilson | Apr. 20, 1920 |
| 1,663,108 | Bessman et al. | Mar. 20, 1928 |
| 2,096,864 | Strunk | Oct. 26, 1937 |

FOREIGN PATENTS

| 104,751 | Australia | Aug. 5, 1938 |